Oct. 9, 1951  J. B. KEEGAN  2,570,688
FOLDING FISH GAFF
Filed Dec. 11, 1946
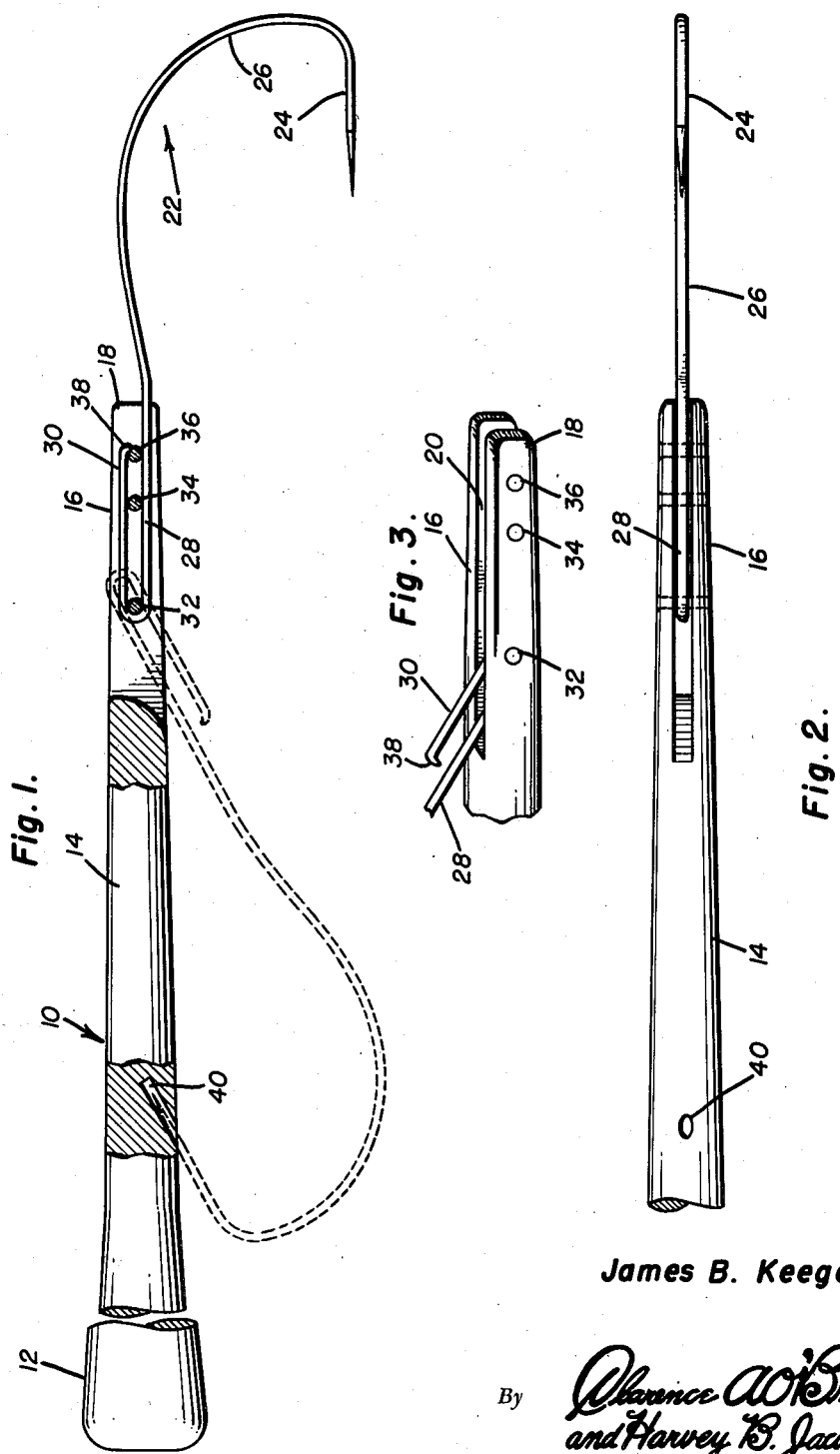
Inventor
James B. Keegan
By Clarence A. O'Brien
and Harvey B. Jacobson
Attorneys Patented Oct. 9, 1951

2,570,688

UNITED STATES PATENT OFFICE 2,570,688

FOLDING FISH GAFF

James B. Keegan, Santa Rosa, Calif.

Application December 11, 1946, Serial No. 715,532

4 Claims. (Cl. 294—26)

This invention relates generally to fish gaffs, and more particularly to an improved folding fish gaff having in combination therewith, a club and a slotted member for removing a fish hook from the mouth of a fish.

The primary object of this invention is to provide in one article, a convenient arrangement of a gaff, a club and an extractor for the selective use thereof, no one article limiting the use of the combination for the alternative function thereof.

Another object of this invention is to provide a device of this character in which the hook may be securely locked in inoperative position so that there is no danger of injury to the hands of the fisherman when the device is being used as a club or as an extractor.

Another object of this invention is to provide a convenient device for removing the hooks from the mouths of larger fishes, this extractor means being guided to the hook without difficulty.

A last object to be specifically mentioned is to provide a device of this character in a form so engineered and designed as to make the device inexpensive and practicable to manufacture, easily understandable and simple to use, and easily made sufficiently sturdy to provide for efficient and durable service.

With these and other objects in view as will appear hereinafter, this invention resides in certain novel features of construction, combination and arrangement of parts and portions as will be hereinafter described in detail and particularly set forth in the appended claims, reference being had to the accompanying drawings which form a material part of this application, and in which:

Figure 1 is a side elevational view of the assembled device, the gaff hook being shown in inoperative position in dotted lines, portions of the handle being broken away to conserve space and other portions of the handle being broken away and the underlying portions being shown in section and in elevation to facilitate the illustration;

Figure 2 is a lower plan view of the assembled device, the club portion of the handle being broken away and the device being illustrated in operative position; and Figure 3 is a fragmentary detail view of one end of the handle which is adapted for use as an extractor, the view being in perspective and including a portion of the hook to show how this hook is retracted into inoperative position.

Similar characters of reference designate similar or identical parts and portions throughout the specification and throughout the several views of the drawings.

Referring now to the drawings which illustrate a preferred embodiment of this invention, it will be readily seen that the handle portion generally indicated by the numeral 10 may be thought of as comprised of four distinct portions, the enlarged club end 12, the central portion 14, the slotted portion 16, and a specially adapted portion of this slotted portion 16 which is used to facilitate the extraction of the hook from the mouth of the fish and is disposed at the smaller end 18 of the handle. The enlarged club end 12 may be weighted, if desired, and is used to kill the fish after the same has been landed and sometimes prior to the removal of the hook from the mouth of the fish. The central portion of the handle 14 is preferably tapered and the slotted portion 16 may be integral with the other portions; the slot 20 being longitudinally disposed with reference to the handle and open at the end 18. In using the end 18 for the extraction of a hook from the mouth of a fish, the device is guided into the mouth by inserting the line into the slot 20 and then sliding the device along the line. When the end 18 reaches and contacts the hook pressure may be applied to disengage the fish hook.

A hook generally indicated by the numeral 22 is comprised of a point at the end of a straight portion 24, a curved portion 26 and a U-shaped shank portion composed of the two arms 28 and 30. In the embodiment illustrated, three transversely disposed pins 32, 34 and 36, are terminally secured to the portion 16 to cross the slot 20 at spaced positions as shown in the drawings. The pin 32 provides pivotal securement for the hook 22, and the two pins 34 and 36 co-act with the pin 32 to give rigid support to the portions 28 and 30 when the hook is in operative position, that is, pulled forwardly in the portion 16 of the handle. A terminal portion 38 on the member 30 is bent downwardly to comprise a hook or latch adapted to engage the pin 36 and to retain the hook in forward operative position, it being understood that the hook member must be formed of a material sufficiently resilient to allow the portions 28 and 30 to spread sufficiently to pass over the pins 34 and 36. It will also be noted that the pins 34 and 36 have a similar function in jointly supporting one end of the U-shaped portion of the hook, and a modified form of this invention employing one pin in place of these two pins is a reasonable variation of this invention, well within the scope and spirit thereof.

To disengage the hook from its operative position, the hook is forced to the left in Figure 1, that is, toward the club end of the handle, so that the member 30 is no longer in contact with either the pin 34 or 36. The hook is then rotated about the pin 32 and the point of the hook is inserted in the angularly disposed aperture 40 provided in the medial section 14 of the handle, the resiliency of the hook being utilized to hold the point of the hook securely in the aperture 40, all as illustrated in Figure 1 of the drawings.

The operation of this device will be obvious from a consideration of the foregoing description of the mechanical details thereof but in recapitulation it may be noted that this device has three main uses, as a club, as a gaff, and as a hook remover, the device being used selectively, that is, one of these elements only being usable at one time. When the device is used as a gaff, the straight portion 24 of the hook provides for deep penetration of the flesh of the fish and a firm hold thereon and the exact form of the hook in this invention is considered an important feature. The shape and size of the handle is not material, but for the most ample achievement of the objects of this invention it is thought that this handle should be in the order of about twelve inches long, the advantages derived by such proportioning being obvious to fishermen, especially sport fishermen who frequently require a club in handling the fish caught.

Though there has been shown a particular embodiment of this invention, this specification is not limited to this particular embodiment, but it is desired to include in the scope of this invention combinations, constructions and arrangement of parts and portions substantially as set forth in the appended claims.

Having thus described this invention, what is claimed as new and desired to be secured by Letters Patent is:

1. A fish gaff having a handle with a slot at one end thereof, a hook with a U-shaped shank having a pivot pin securing the same in said slot, said U-shaped shank having an inwardly projecting member, a fixed transverse pin secured to span said slot and spaced from said pivot pin to engage said U-shaped shank and said inwardly projecting member and to co-act with said pivot to hold the hook in operative position, said pivot pin and transverse pin being parallel and extending through said U-shaped shank and means on said handle to hold said hook in inoperative position.

2. A gaff according to claim 3 and in which said hook is resilient to yieldably engage in said aperture on the handle, said shank being also resilient to allow release of said inwardly projecting member from said transverse pin when the hook is forcibly moved in one direction relative to the handle.

3. A hook according to claim 1 and wherein said means is an angularly disposed aperture in said handle to receive the point of said hook.

4. A fish gaff having a handle with a slot at one end thereof, a hook with a U-shaped shank having a pivot pin securing the same in said slot, a fixed transverse pin secured to span said slot and spaced from said pivot pin to engage said U-shaped shank and to coact with said pivot to hold the hook in operative position, said pivot pin and transverse pin being parallel and extending through said U-shaped shank, said U-shaped shank having an inwardly projecting member engaging said transverse pin and releasably locking the hook in said operative position, and means on said handle to hold said hook in inoperative position, said shank, pins and slot being proportioned to allow the shank to be released from said transverse pin and pivoted on said pivot pin, whereby the shank is removed from the extremity of the slotted end of the handle and said extremity is adapted when the hook is in inoperative position to comprise means for removing a fish hook from the mouth of a fish.

JAMES B. KEEGAN.

REFERENCES CITED

The following references are of record in the file of this patent:

UNITED STATES PATENTS

| Number | Name | Date |
|---|---|---|
| 827,246 | Livingston | July 31, 1906 |
| 1,258,632 | Harris | Mar. 5, 1918 |
| 1,563,716 | Briggs | Dec. 1, 1925 |
| 1,596,631 | Seibold | Aug. 17, 1926 |
| 2,052,705 | Glass | Sept. 1, 1936 |
| 2,112,765 | Darling | Mar. 29, 1938 |
| 2,496,822 | Stoddard | Feb. 7, 1950 |

FOREIGN PATENTS

| Number | Country | Date |
|---|---|---|
| 2,732 | Great Britain | of 1889 |
| 3,076 | Austria | July 15, 1900 |